United States Patent
Masuda

(10) Patent No.: US 11,766,973 B2
(45) Date of Patent: Sep. 26, 2023

(54) VEHICLE INTERIOR COMPONENT

(71) Applicant: NIHON PLAST CO., LTD., Fujinomiya (JP)

(72) Inventor: Yasuhisa Masuda, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 72 days.

(21) Appl. No.: 17/478,992

(22) Filed: Sep. 20, 2021

(65) Prior Publication Data

US 2022/0097629 A1    Mar. 31, 2022

(30) Foreign Application Priority Data

Sep. 29, 2020  (JP) ................. 2020-163091

(51) Int. Cl.
*B60R 13/02* (2006.01)

(52) U.S. Cl.
CPC .......... *B60R 13/0206* (2013.01); *B60R 13/02* (2013.01)

(58) Field of Classification Search
CPC ....... B60R 13/01; B60R 13/011; B60R 13/02; B60R 13/0206; B60R 13/0212; B60R 13/0218; B60R 13/0225; B60R 13/0231; B60R 13/0237; B60R 13/0243; B60R 13/025; B60R 13/0256; B60R 13/0262; B60Q 3/50; B60Q 3/51; Y10T 24/304; Y10T 24/309; F16B 21/075; F16B 5/06; F16B 5/0664; F16B 5/065; F16B 5/0657
USPC ......... 296/1.07, 39.1, 70, 209; 293/120, 121
See application file for complete search history.

(56) References Cited

U.S. PATENT DOCUMENTS

2014/0293632 A1    10/2014    Watanabe

FOREIGN PATENT DOCUMENTS

| JP | 2014-201111 | | 10/2014 | |
|---|---|---|---|---|
| JP | 2015039937 A | * | 3/2015 | ............ B60R 13/02 |
| WO | WO-2017212518 A1 | * | 12/2017 | |

OTHER PUBLICATIONS

Yuta, "Attachment Structure for Resin Molding", Published: Dec. 14, 2017, Edition: WO2017212518 (Year: 2017).*
Hiruta, "Door Trim for Vehicle", Published: Mar. 2, 2015, Publisher: Japanese Patent Office, Edition: JP2015039937A (Year: 2015).*

* cited by examiner

*Primary Examiner* — Dennis H Pedder
*Assistant Examiner* — Joyce Eileen Hill
(74) *Attorney, Agent, or Firm* — AMIN, TUROCY & WATSON, LLP

(57) ABSTRACT

There is provided a panel capable of assembling a first member and a second member in a small space while suppressing the influence of dimensional variation. Panel 11 is attached to attachment section 15. Panel 11 includes first member 20 formed in an elongated shape. Panel 11 includes second member 21 fixed to a back side of first member 20. Panel 11 includes locking section 24 formed on either first member 20 or second member 21 and locked to attachment section 15. Panel 11 includes positioning section 22 that positions first member 20 and second member 21 relative to each other. Panel 11 includes fixing section 23 that fixes first member 20 and second member 21 to each other. Locking section 24, positioning section 22, and fixing section 23 are arranged side by side in a direction intersecting a longitudinal direction of first member 20.

2 Claims, 4 Drawing Sheets

VEHICLE INTERIOR COMPONENT

CROSS REFERENCE TO RELATED APPLICATIONS

Japanese Patent Application No. 2020-163091 filed on Sep. 29, 2020, including description, claims, drawings, and abstract the entire disclosure is incorporated herein by reference in its entirety.

TECHNICAL FIELD

The present invention relates to a vehicle interior component attached to an attachment section.

BACKGROUND ART

In the related art, in a vehicle such as an automobile, a structure in which members are combined with each other is used, such as a case where an interior component that serves as a functional component that adds decorativeness and visibility is attached to a vehicle compartment. For example, in a structure in which a light emitting body is held between a plurality of panels that configure an instrument panel of an automobile, those panels are known to be superposed (for example, refer to Patent Literature 1).

CITATION LIST

Patent Literature

PTL 1
Japanese Patent Application Laid-Open No. 2014-201111 (Pages 4 to 8, FIG. 1)

SUMMARY OF INVENTION

Technical Problem

In a case of a configuration in which a plurality of members are combined with each other in this manner, it is required to reduce the influence of dimensional variation of each member.

In recent years, the design that makes the instrument panel look thin has become the mainstream, it may be required to ensure as large and comfortable vehicle compartment space as possible assuming an autonomous driving vehicle, and thus, it is also required to attach the interior component to a limited space.

The present invention has been made in view of such a point, and an object of the present invention is to provide a vehicle interior component that can be assembled in a small space while suppressing the influence of dimensional variation between a first member and a second member.

Solution to Problem

According to claim 1, there is provided a vehicle interior component attached to an attachment section, including: a first member formed in an elongated shape; a second member fixed to a back side of the first member; a locking section formed on either the first member or the second member and locked to the attachment section; a positioning section that positions the first member and the second member relative to each other; and a fixing section that fixes the first member and the second member to each other, in which the locking section, the positioning section, and the fixing section are arranged side by side in a direction intersecting a longitudinal direction of the first member.

According to the vehicle interior component according to claim 2, in the vehicle interior component according to claim 1, the second member has an insertion hole, and the locking section is formed in the first member, inserted into the insertion hole, and locked to the attachment section.

Advantageous Effects of Invention

According to the vehicle interior component according to claim 1, since the locking section, the positioning section, and the fixing section are arranged side by side in the direction intersecting the longitudinal direction of the first member, the first member and the second member are assembled in a small space while suppressing the influence of dimensional variation.

According to the vehicle interior component according to claim 2, in addition to the effect of the vehicle interior component according to claim 1, the strength of the first member can be utilized to stably attach the vehicle interior component to the attachment section.

BRIEF DESCRIPTION OF DRAWINGS

FIG. 1A is a front view seen from a second member side, and FIG. 1B is a central sectional view of FIG. 1A;

DESCRIPTION OF EMBODIMENTS

Hereinafter, an embodiment of the present invention will be described with reference to the drawings.

Figure 4:
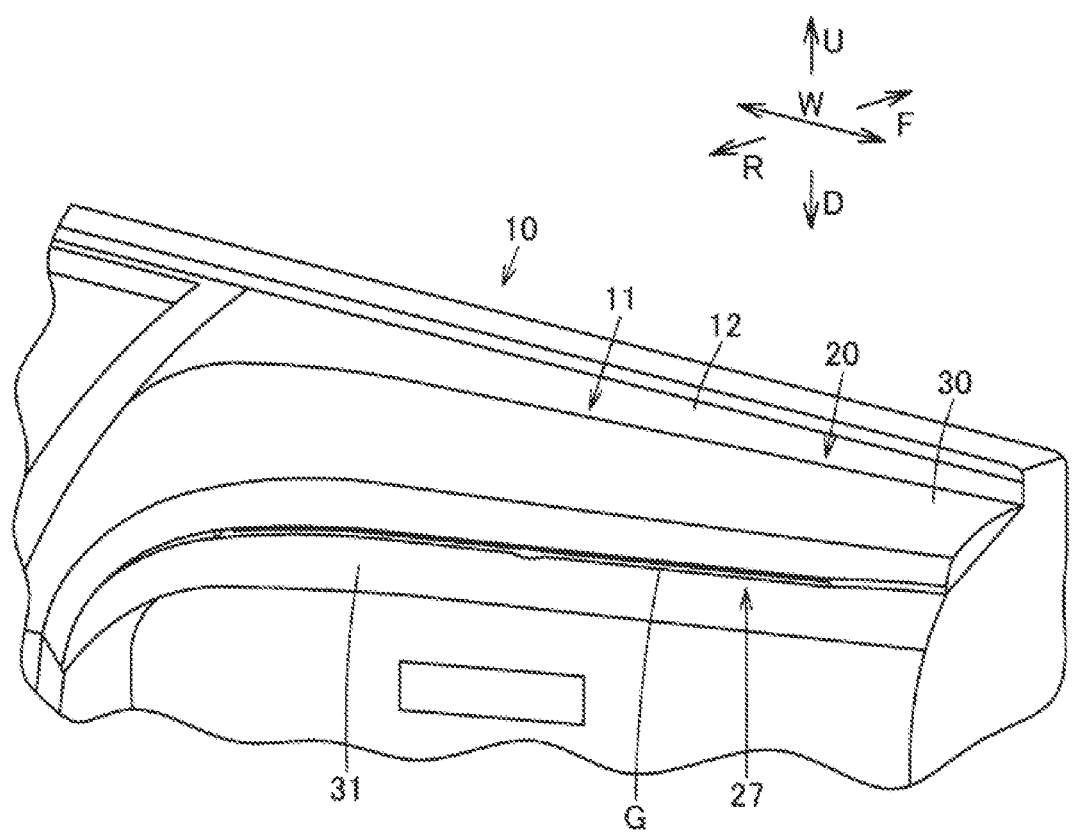
FIG. 4 is a perspective view of a part of an automobile component provided with the vehicle interior component.

In FIG. 4, 10 indicates an instrument panel. Instrument panel 10 is an automobile component which is an interior component positioned in front of front seats in a vehicle compartment of an automobile, which is a vehicle that serves as rideable means, and attached to a vehicle body that faces occupants in the front seats. Hereinafter, the directions such as front-rear, up-down, and both-side directions will be described with reference to the straight-forward direction of the vehicle body. An arrow F direction is a forward direction, an arrow R direction is a rearward direction, an arrow U direction is an upward direction, an arrow D direction is a downward direction, and an arrow W direction is a vehicle width direction. Instrument panel 10 illustrated in FIG. 4 will be described by taking as an example the one in front of the passenger seat in a left-hand drive vehicle, but in a case of a right-hand drive vehicle, basically, the left-right direction may be reversed.

Instrument panel 10 is formed to be elongated in the vehicle width direction. Instrument panel 10 is formed with panel attaching section 12 to which panel 11, which is a vehicle interior component, is attached.

Figure 1A:
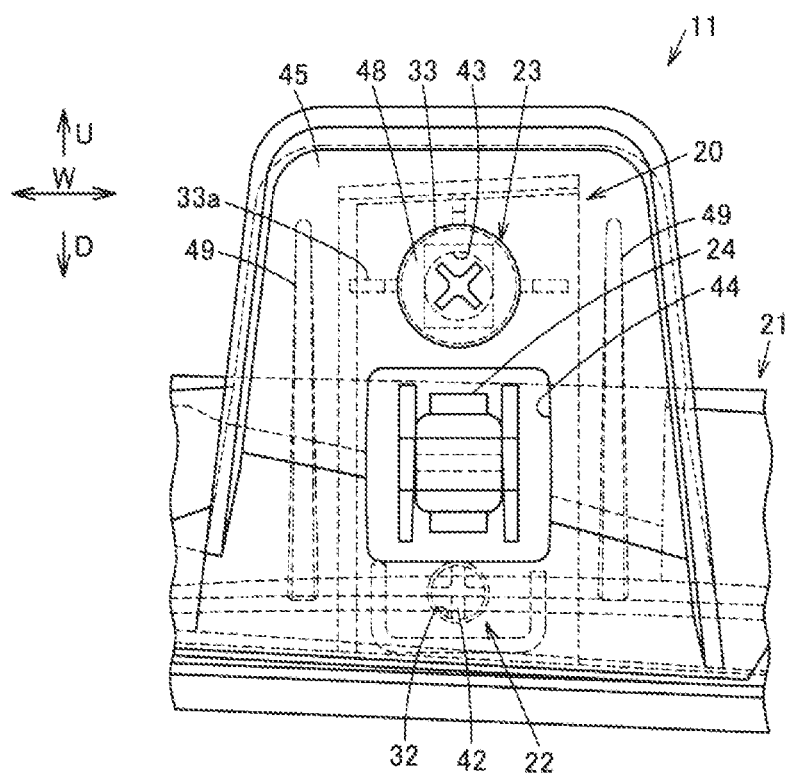
FIGS. 1A and 1B illustrate a vehicle interior component according to an embodiment of the present invention.
Figure 1B:
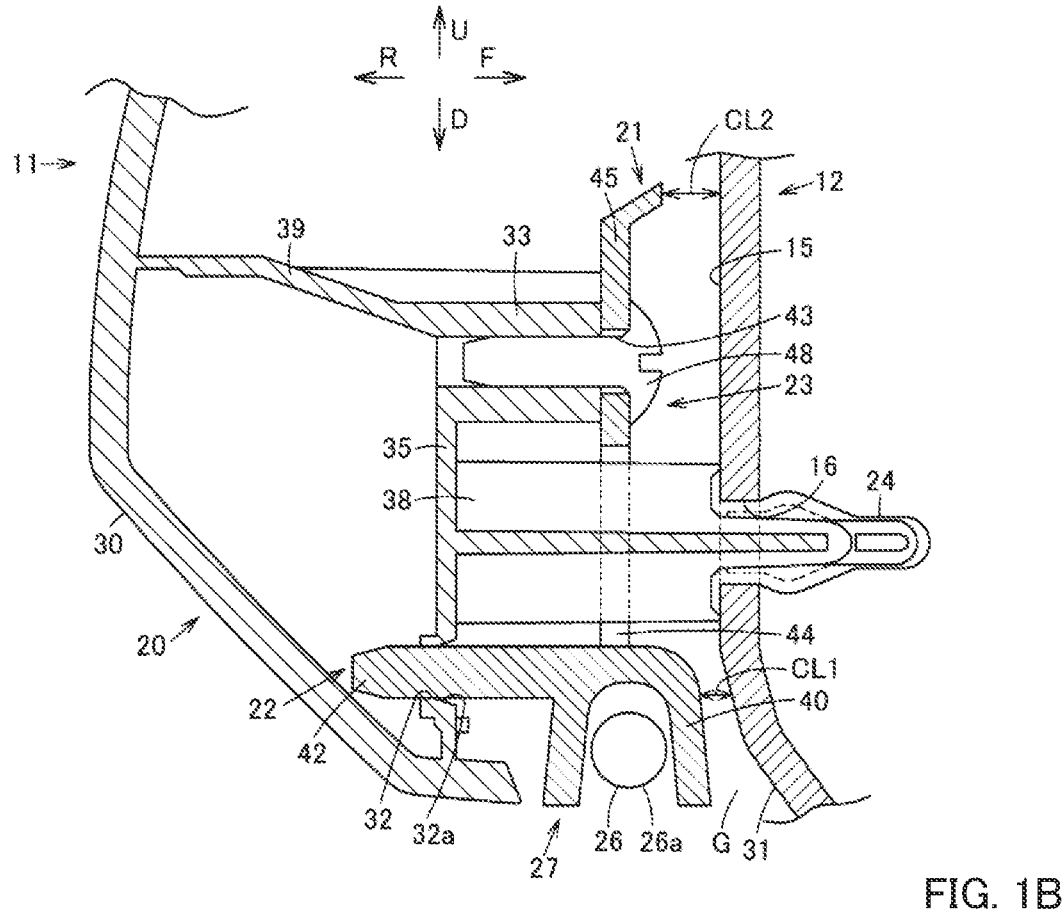

As illustrated in FIG. 1B, panel attaching section 12 has attachment section 15 that receives panel 11. Attachment section 15 is formed in a planar shape along the up-down direction. Attachment section 15 is formed with receiving section 16 for locking panel 11. In the present embodiment, receiving section 16 is a through-hole, and is formed to penetrate attachment section 15 in the front-rear direction, which is a plate thickness direction.

Panel 11 is disposed to face the occupant, and is configured by combining first member 20 and second member 21 with each other. First member 20 and second member 21 are positioned relative to each other by positioning section 22, and are locked to attachment section 15 of panel attaching section 12 by locking section 24 in a state of being fixed to each other by fixing section 23. Lighting section 26, which is a decorative section, is attached to panel 11, and panel 11 and lighting section 26 configure indirect lighting apparatus 27 (for rideable means) that serves as a rideable means lighting apparatus (vehicle lighting apparatus).

Figure 2:
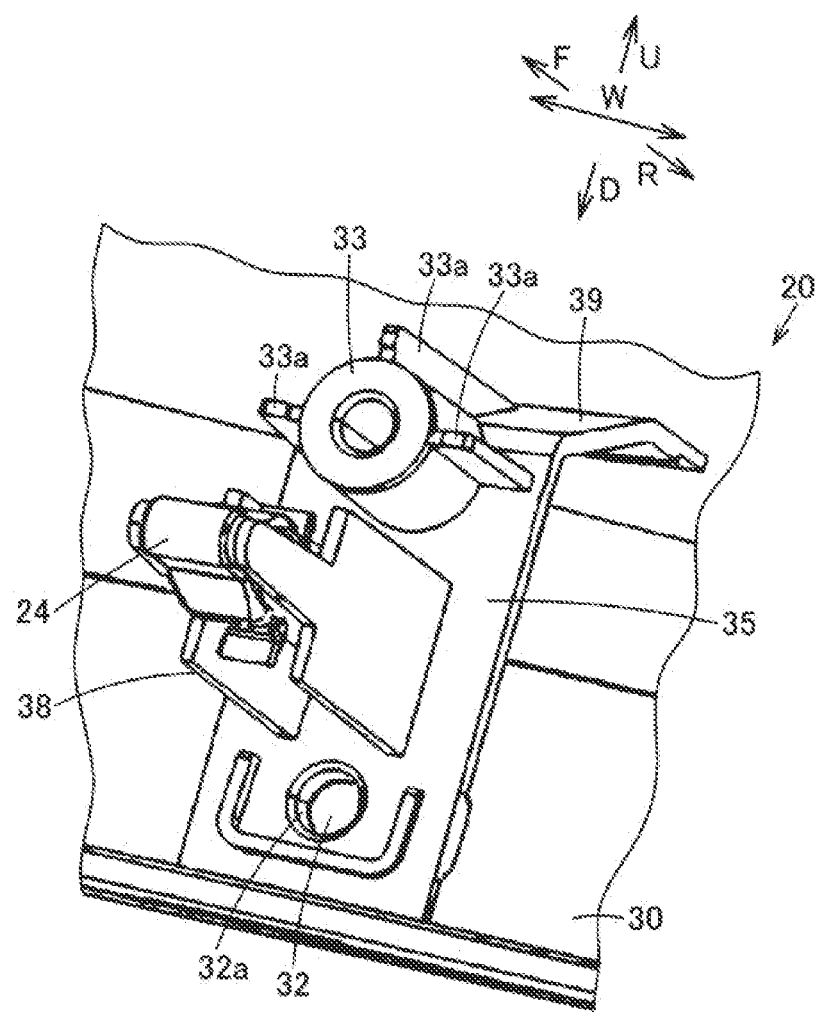
FIG. 2 is a perspective view illustrating a part of a first member of the vehicle interior component.

First member 20 illustrated in FIGS. 1A, 1B, and 2 configures a panel main body of instrument panel 10. First member 20 is integrally molded with a member such as a synthetic resin. First member 20 is formed in an elongated shape having a longitudinal direction along the both-side directions, that is, the vehicle width direction. First member 20 includes first member main body section 30. First member main body section 30 is a part of first member 20, which is positioned on the rearmost side, that is, the occupant side, and forms a design surface of first member 20. First member main body section 30 is formed in an elongated shape. The lower end portion of first member main body section 30 is disposed to be apart in the rearward direction with respect to extension section 31 that extends downward from attachment section 15 in panel attaching section 12. Therefore, irradiation opening G that opens downward is formed between first member main body section 30 and extension section 31. Irradiation opening G is formed in a slit shape that extends in the vehicle width direction.

First member 20 includes first positioning section 32 that forms a part of positioning section 22, and first fixing section 33 that forms a part of fixing section 23. Furthermore, in the present embodiment, locking section 24 is formed on first member 20. In the present embodiment, first positioning section 32, first fixing section 33, and locking section 24 are formed on first forming section 35.

First positioning section 32 is a hole section in the illustrated example. In the present embodiment, first positioning section 32 is a round hole. First positioning section 32 is formed to penetrate first forming section 35 in the front-rear direction, that is, in the fixing direction between first member 20 and second member 21. Inclined section 32a, which is a catching section, is formed at the peripheral edge portion of first positioning section 32. Inclined section 32a expands toward the front side, which is second member 21 side.

First fixing section 33 is a screw boss in the illustrated example. In other words, first fixing section 33 is formed in a cylindrical shape. First fixing section 33 is disposed with the axial direction as the front-rear direction. First fixing section 33 protrudes forward from first forming section 35. Rib 33a, which is a reinforcing section, is formed around first fixing section 33.

Locking section 24 is a clip that is inserted and engaged with receiving section 16 in the illustrated example. Locking section 24 protrudes forward from first forming section 35. Locking section 24 is disposed at the tip end portion of attaching seat section 38 that protrudes forward from first forming section 35. Attaching seat section 38 is formed parallel to or substantially parallel to first fixing section 33, and in the present embodiment, attaching seat section 38 protrudes in the same direction as first fixing section 33 with respect to first forming section 35. Furthermore, the tip end portion of attaching seat section 38 extends forward from first fixing section 33. Therefore, locking section 24 is positioned in front of first fixing section 33. Attaching seat section 38 restricts the insertion position of locking section 24 with respect to receiving section 16, that is, the position in the front-rear direction.

First positioning section 32, first fixing section 33, and locking section 24 are arranged side by side in a direction intersecting the longitudinal direction of first member 20 and in the up-down direction in the present embodiment. In the illustrated example, first fixing section 33, locking section 24, and first positioning section 32 are arranged side by side on a straight line from the upper side to the lower side in this order. In other words, first positioning section 32 and first fixing section 33 are positioned on sides opposite to each other with locking section 24 as a reference.

First forming section 35 is formed in a plate shape in the illustrated example. First forming section 35 is positioned on the back side of first member main body section 30, that is, on the front side of first member main body section 30, and faces the rear portion of second member 21. First forming section 35 is formed in a rectangular shape that is long in the direction intersecting the longitudinal direction of first member main body section 30, and in the up-down direction in the present embodiment. In first forming section 35, the upper end portion, which is one end portion, is connected to the back surface of first member main body section 30 by connecting section 39 that extends in the front-rear direction, and the lower end portion, which is the other end portion, is directly connected to the back surface of first member main body section 30.

Figure 3:
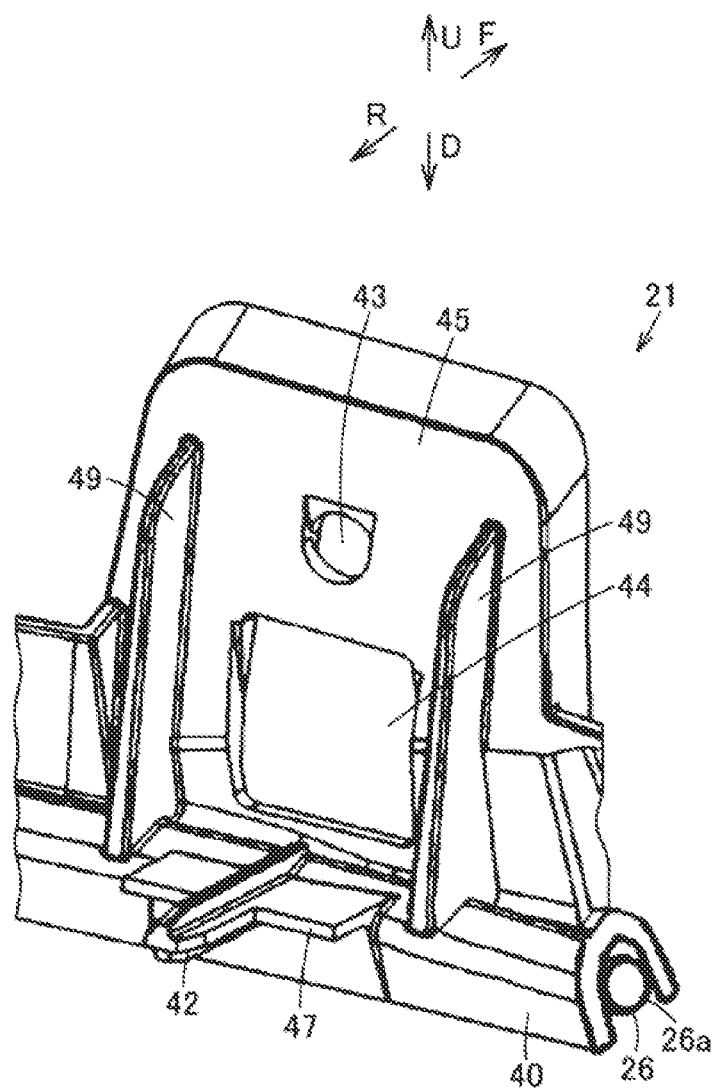
FIG. 3 is a perspective view illustrating a part of the second member of the vehicle interior component.

Second member 21 illustrated in FIGS. 1A, 1B, and 3 is sandwiched and accommodated between first member 20 and panel attaching section 12, and is basically not exposed to the outside. Second member 21 is integrally molded with a member such as a synthetic resin. For example, second member 21 is molded with a member such as a synthetic resin that is softer than first member 20. Second member 21 is formed in an elongated shape having a longitudinal direction along the both-side direction, that is, the vehicle width direction. Second member 21 includes second member main body section 40. Second member main body section 40 is a holding section that is positioned at the lowermost side of second member 21 and holds lighting section 26. In other words, second member 21 is a holding member that holds lighting section 26. Second member main body section 40 is formed by being opened downward, and has an elongated shape in both-side direction, that is, in the vehicle width direction. Second member main body section 40 is positioned to face irradiation opening G.

Second member 21 includes second positioning section 42 that forms a part of positioning section 22, and second fixing section 43 that forms a part of fixing section 23. Furthermore, in the present embodiment, insertion hole 44 which is a release hole into which locking section 24 is inserted, on second member 21. In the present embodiment, second positioning section 42, second fixing section 43, and insertion hole 44 are formed in second forming section 45.

Second positioning section 42 is a projection section in the illustrated example. In the present embodiment, second positioning section 42 is a linear section that is press-fitted into first positioning section 32 rearward. Second positioning section 42 protrudes rearward from second forming section 45. Insertion restricting section 47 is formed at the base end portion of second positioning section 42. Insertion restricting section 47 restricts the insertion position of second positioning section 42 with respect to first positioning section 32, that is, the position in the front-rear direction.

Insertion restricting section 47 is a rib formed along the vehicle width direction which is the both-side direction, that is, the longitudinal direction of second member main body section 40, and has a thickness direction in the up-down direction. Insertion restricting section 47 is formed at the rear portion of second forming section 45.

Second fixing section 43 is a screw receiving hole section in the illustrated example. In the present embodiment, second fixing section 43 is a round hole, and second fixing section 43 is formed to penetrate second forming section 45 in the front-rear direction, that is, in the fixing direction between first member 20 and second member 21. Second fixing section 43 is positioned with respect to first fixing section 33 by positioning first member 20 and second member 21 relative to each other by positioning section 22, and is positioned coaxially with first fixing section 33. Fixing member 48 is inserted into second fixing section 43 positioned with first fixing section 33. Fixing member 48 is a tapping screw in the present embodiment. Fixing member 48 is inserted into second fixing section 43 from the front side and screwed into first fixing section 33 to fasten and fix first member 20 and second member 21.

In the illustrated example, insertion hole 44 is a square hole wider than second fixing section 43 in the left-right direction and the up-down direction. Insertion hole 44 is formed to penetrate second forming section 45 in the front-rear direction. Insertion hole 44 is positioned with locking section 24 by positioning first member 20 and second member 21 relative to each other by positioning section 22, and locking section 24 is inserted through insertion hole 44.

Second positioning section 42, second fixing section 43, and insertion hole 44 are arranged side by side in a direction intersecting the longitudinal direction of first member 20 and in the up-down direction in the present embodiment. In the illustrated example, second fixing section 43, insertion hole 44, and second positioning section 42 are arranged side by side on a straight line from the upper side to the lower side in this order.

Second forming section 45 is formed in a plate shape in the illustrated example. Second forming section 45 is formed to extend upward from the upper portion of second member main body section 40, and faces first forming section 35 of first member 20 to be apart in the front-rear direction. Second forming section 45 is formed in a rectangular shape that is long in the direction intersecting the longitudinal direction of second member main body section 40, and in the up-down direction in the present embodiment. Reinforcing section 49 is formed in second forming section 45. Reinforcing section 49 is formed on the back side of second forming section 45, that is, on first member 20 side (the side that faces first forming section 35). In the present embodiment, reinforcing sections 49 are ribs that are positioned on both sides of second positioning section 42, second fixing section 43, and insertion hole 44 and extends in the up-down direction.

Lighting section 26 is configured to guide light from a light source section having a light emitting element such as an LED by light emitting body 26a. Light emitting body 26a is formed to extend in the both-side direction, that is, in the vehicle width direction, for example. The light source section is supplied with power from the power supply section for the rideable means (vehicle). Light emitting body 26a is formed, for example, in the shape of a tube having a circular cross section, is held by second member main body section 40 of second member 21, and faces the upper portion of irradiation opening G.

Panel 11 assembles pre-molded first member 20 and second member 21.

In other words, first member 20 and second member 21 are positioned with first positioning section 32 and second positioning section 42, and accordingly, locking section 24 and insertion hole 44 and first fixing section 33 and second fixing section 43 are respectively positioned. At this time, by positioning first forming section 35 of first member 20 between reinforcing sections 49 and 49, the positions of first member 20 and second member 21 in the longitudinal direction are relatively restricted, and first positioning section 32 and second positioning section 42 are easily positioned.

In this state, when first member 20 and second member 21 are pushed to approach each other, second positioning section 42 is press-fitted into first positioning section 32, locking section 24 is inserted into insertion hole 44, and at the same time, first fixing section 33 and second fixing section 43 overlap each other. Furthermore, first member 20 and second member 21 are fixed to each other by inserting and tightening fixing member 48 to first fixing section 33 via second fixing section 43. Lighting section 26 may be held by second member 21 in advance before assembling first member 20 and second member 21, or after assembling first member 20 and second member 21, light emitting body 26a may be attached to second member main body section 40 of second member 21.

Panel 11 in which first member 20 and second member 21 are assembled in this manner is attached to attachment section 15 of panel attaching section 12. In other words, panel 11 is attached to attachment section 15 of panel attaching section 12 with one touch by press-fitting locking section 24 into receiving section 16 of attachment section 15 from behind. In this state, fixing section 23, locking section 24, and positioning section 22 are arranged on a straight line from the upper side to the lower side in this order in the direction intersecting the longitudinal direction of first member 20, that is, on the same cross section. Panel 11 is restricted in the front-rear direction with respect to attachment section 15 (panel attaching section 12) when attaching seat section 38 abuts against the front surface of attachment section 15, and the clearance between second member 21 and attachment section 15 (panel attaching section 12) is ensured. In the illustrated example, a clearance CL2 between second forming section 45 and attachment section 15 (panel attaching section 12) becomes larger than a clearance CL1 between second member main body section 40 and attachment section 15 (panel attaching section 12) of second member 21.

As a result, irradiation opening G that opens downward is formed between the lower end portion of first member 20 of panel 11 and extension section 31, and indirect lighting apparatus 27 in which light emitting body 26a of lighting section 26 is positioned facing irradiation opening G is configured.

Indirect lighting apparatus 27 emits light downward through irradiation opening G to decorate the irradiated section such as the glove box below instrument panel 10 and improve the visibility.

As described above, according to the embodiment, since locking section 24, positioning section 22, and fixing section 23 are arranged side by side in the direction intersecting the longitudinal direction of first member 20, first member 20 and second member 21 are assembled in a small space while suppressing the influence of dimensional variation.

Since second member 21 may be formed of a relatively soft synthetic resin, locking section 24 is formed on first member 20 which is generally stronger than second member 21, and accordingly, second member 21 can be stably attached to attachment section 15 by utilizing the strength of first member 20.

In particular, since locking section 24 is in the immediate vicinity of positioning section 22, that is, there is no fixing section 23 between locking section 24 and positioning section 22, for example, even when first member 20 and second member 21 are made of a soft material and have a large deformation, the deformation variation is unlikely to occur, and the influence of the dimensional variation and the deformation variation on attachment section 15 is almost eliminated. Therefore, even when the clearance between panel 11 and panel attaching section 12 is set narrower, abnormal noise due to these contacts is less likely to occur, and thus, these clearances can be minimized, instrument panel 10 can be made thinner in the front-rear direction, and the appearance can be improved.

In the above embodiment, the relationship between first positioning section 32 and second positioning section 42 of positioning section 22 and the relationship between first fixing section 33 and second fixing section 43 of fixing section 23 may be reversed, respectively. In other words, first positioning section 32 may be a projection section, second positioning section 42 may be a hole section, first fixing section 33 may be a screw receiving hole section, and second fixing section 43 may have a boss shape.

Locking section 24 may be formed on second member 21 instead of first member 20.

Furthermore, the configuration in which positioning section 22, locking section 24, and fixing section 23 are arranged side by side in the up-down direction on panel 11 with the longitudinal direction as the vehicle width direction has been described, but not being limited thereto, the same effect can be obtained even when positioning section 22, locking section 24, and fixing section 23 are arranged side by side in the vehicle width direction with respect to the panel having the longitudinal direction in the vehicle height direction, that is, the up-down direction.

INDUSTRIAL APPLICABILITY

The present invention can be suitably used as a vehicle interior component for improving the decorativeness of a vehicle such as an automobile.

REFERENCE SIGNS LIST

11 Panel which is vehicle interior component
15 Attachment section
20 First member
21 Second member
22 Positioning section
23 Fixing section
24 Locking section
44 Insertion hole

What is claimed is:

1. A vehicle interior component attached to an attachment section, comprising:
   a first member formed in an elongated shape;
   a second member fixed to a back side of the first member;
   a locking section formed on either the first member or the second member and locked to the attachment section;
   a positioning section that positions the first member and the second member relative to each other; and
   a fixing section that fixes the first member and the second member to each other,
   wherein the locking section, the positioning section, and the fixing section are arranged side by side in a direction intersecting a longitudinal direction of the first member such that the positioning section and the fixing section are positioned on sides opposite to each other with the locking section as a reference.

2. The vehicle interior component according to claim 1, wherein the second member has an insertion hole, and the locking section is formed in the first member, inserted into the insertion hole, and locked to the attachment section.

* * * * *